United States Patent
Cui et al.

(10) Patent No.: US 11,609,342 B2
(45) Date of Patent: Mar. 21, 2023

(54) LATENCY COMPENSATION IN INERTIAL NAVIGATION SYSTEM

(71) Applicants: Baidu USA LLC, Sunnyvale, CA (US); Baidu.com Times Technology (Beijing) Co., Ltd., Beijing (CN)

(72) Inventors: Yan Cui, Sunnyvale, CA (US); Quanwei Liu, Sunnyvale, CA (US); Yao Zhuo, Beijing (CN)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 393 days.

(21) Appl. No.: 16/649,559

(22) PCT Filed: Mar. 5, 2020

(86) PCT No.: PCT/CN2020/077982
§ 371 (c)(1),
(2) Date: Mar. 20, 2020

(87) PCT Pub. No.: WO2021/174485
PCT Pub. Date: Sep. 10, 2021

(65) Prior Publication Data
US 2022/0299656 A1    Sep. 22, 2022

(51) Int. Cl.
*G01S 19/40* (2010.01)
*G01S 19/49* (2010.01)
*G01C 21/16* (2006.01)

(52) U.S. Cl.
CPC ............ *G01S 19/40* (2013.01); *G01C 21/165* (2013.01); *G01S 19/49* (2013.01)

(58) Field of Classification Search
CPC ........ G01S 19/40; G01S 19/49; G01C 21/165
(Continued)

(56) References Cited

U.S. PATENT DOCUMENTS 8,885,151 B1 * 11/2014 Chatham ................. G01S 17/42
356/4.07
10,473,789 B1 * 11/2019 Day ........................ G01S 19/51
(Continued)

FOREIGN PATENT DOCUMENTS

CN    101105401 A    1/2008
CN    106154299 A    11/2016
(Continued)

OTHER PUBLICATIONS

Fu, Tingqiang et al. GPS/INS Delay Estimation and Delay Compensation Based on Residual Reconstruction Journal of Shanghai Jiao Tong University Oct. 28, 2019(Oct. 28, 2019) No. 10 vol. 53 ISSN: 1006-2467 pp. 1210-1016.
(Continued)

*Primary Examiner* — Harry K Liu
(74) *Attorney, Agent, or Firm* — Womble Bond Dickinson (US) LLP

(57) ABSTRACT

In one embodiment, a method for calculating a location of an autonomous driving vehicle includes receiving new global navigation satellite system (GNSS) data. The method further includes identifying a first previously estimated location from a plurality of previously estimated locations with a timestamp that is closest to the timestamp of the new GNSS data and identifying a second previously estimated location from the plurality of previously estimated locations with a most recent timestamp. The method further includes calculating a difference between the first previously estimated location and the second previously estimated location, adjusting the new GNSS data based on the difference; and calculating a current estimated location of the ADV based on the adjusted GNSS data.

20 Claims, 9 Drawing Sheets

(58) Field of Classification Search
USPC .................................................. 342/357.23
See application file for complete search history.

(56) References Cited

U.S. PATENT DOCUMENTS

2017/0328716 A1* 11/2017 Ma .................... G06V 10/764
2022/0179102 A1* 6/2022 McDaniel ............... G01S 19/47

FOREIGN PATENT DOCUMENTS

| CN | 108535755 A | | 9/2018 |
|---|---|---|---|
| CN | 109724598 A | | 5/2019 |
| CN | 110888436 A | * | 3/2020 |
| JP | 2012177564 A | | 9/2012 |

OTHER PUBLICATIONS

Hansen J. M. et al. Nonlinear Observer Design for GNSS-aided Inertial Navigation Systems with Time-delayed GNSS Measurements Control Engineering Practice Dec. 30, 2017(Dec. 30, 2017) No. 60 ISSN:0967-0661 pp. 39-50.

* cited by examiner

LATENCY COMPENSATION IN INERTIAL NAVIGATION SYSTEM

CROSS-REFERENCE TO RELATED APPLICATION

This patent application is a U.S. National Phase Application under 35 U.S.C. § 371 of International Application No. PCT/CN2020/077982, filed Mar. 5, 2020, entitled "LATENCY COMPENSATION IN INERTIAL NAVIGATION SYSTEM," which is incorporated by reference herein in its entirety.

TECHNICAL FIELD

Embodiments of the present disclosure relate generally to operating autonomous vehicles. More particularly, embodiments of the disclosure relate to latency compensation in inertial navigation systems of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers. Onboard processing systems can provide an approximate location of the vehicle using sensor data such as global navigation satellite system data, inertial measurement data, etc.

To calculate a location of an autonomous vehicle, a sensor unit can include a global navigation satellite system (GNSS) and an inertial measurement unit (IMU). The GNSS may measure position, velocity and heading of the vehicle. The GNSS can provide precise data in most circumstances but the data may be received at a processing device of the sensor unit intermittently at relatively large intervals (e.g., 1 second). An IMU may measure acceleration and gyroscopic orientation of the vehicle. The IMU data may be received at the processing device at a much higher frequency than the GNSS data (e.g., milliseconds). The processing device can combine the GNSS data and IMU data to estimate (e.g., using a Kalman filter) a location of the vehicle at the rate that the IMU data is received rather than waiting for GNSS data.

The processing device of the sensor unit may receive the IMU data from an IMU within the sensor unit itself while the GNSS data may be received via a satellite antenna on the roof of the vehicle. Therefore, the IMU data may be transmitted to the processing device much more quickly than the GNSS data which must be transmitted to the sensor unit from the antenna. Additionally, the GNSS data may be processed by a GNSS receiver prior to reaching the processing device, which may add even more time for the GNSS data to reach the processing device. The propagation time of the GNSS data from the antenna to the processing device can result in the GNSS data being used for location estimation at a significant time after the GNSS data was first received. Thus, the GNSS location data may be slightly outdated, or biased, since the vehicle may have traveled some distance from the time the GNSS data is received to the time that the GNSS data is used for location estimation.

SUMMARY

In a first aspect, a method for calculating location of an autonomous driving vehicle (ADV) is provided. The method includes: receiving, at a processing device, new global navigation satellite system (GNSS) data; identifying a first previously estimated location from a plurality of previously estimated locations, the first previously estimated location having a timestamp that is closest to a timestamp of the new GNSS data; identifying a second previously estimated location from the plurality of previously estimated locations, the second previously estimated location having a most recent timestamp; adjusting the new GNSS data based on the difference based on a difference between the first previously estimated location and the second previously estimated location; and calculating, based on the adjusted GNSS data, a current estimated location of the ADV.

In a second aspect, a data processing system for calculating a location of an autonomous driving vehicle (ADV) is provided. The system includes a processing device; and a memory coupled to the processing device to store instructions, which when executed by the processing device, cause the processing device to perform operations including: receiving new global navigation satellite system (GNSS) data; identifying a first previously estimated location from a plurality of previously estimated locations, the first previously estimated location having a timestamp that is closest to a timestamp of the new GNSS data; identifying a second previously estimated location from the plurality of previously estimated locations, the second previously estimated location having a most recent timestamp; adjusting the new GNSS data based on the difference based on a difference between the first previously estimated location and the second previously estimated location; and calculating, based on the adjusted GNSS data, a current estimated location of the ADV.

In a third aspect, a non-transitory machine-readable medium having instructions stored therein is provided. The instructions, when executed by a processor, cause the processor to perform operations including: receiving new global navigation satellite system (GNSS) data; identifying a first previously estimated location from a plurality of previously estimated locations, the first previously estimated location having a timestamp that is closest to a timestamp of the new GNSS data; identifying a second previously estimated location from the plurality of previously estimated locations, the second previously estimated location having a most recent timestamp; adjusting the new GNSS data based on the difference based on a difference between the first previously estimated location and the second previously estimated location; and calculating, based on the adjusted GNSS data, a current estimated location of the ADV.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
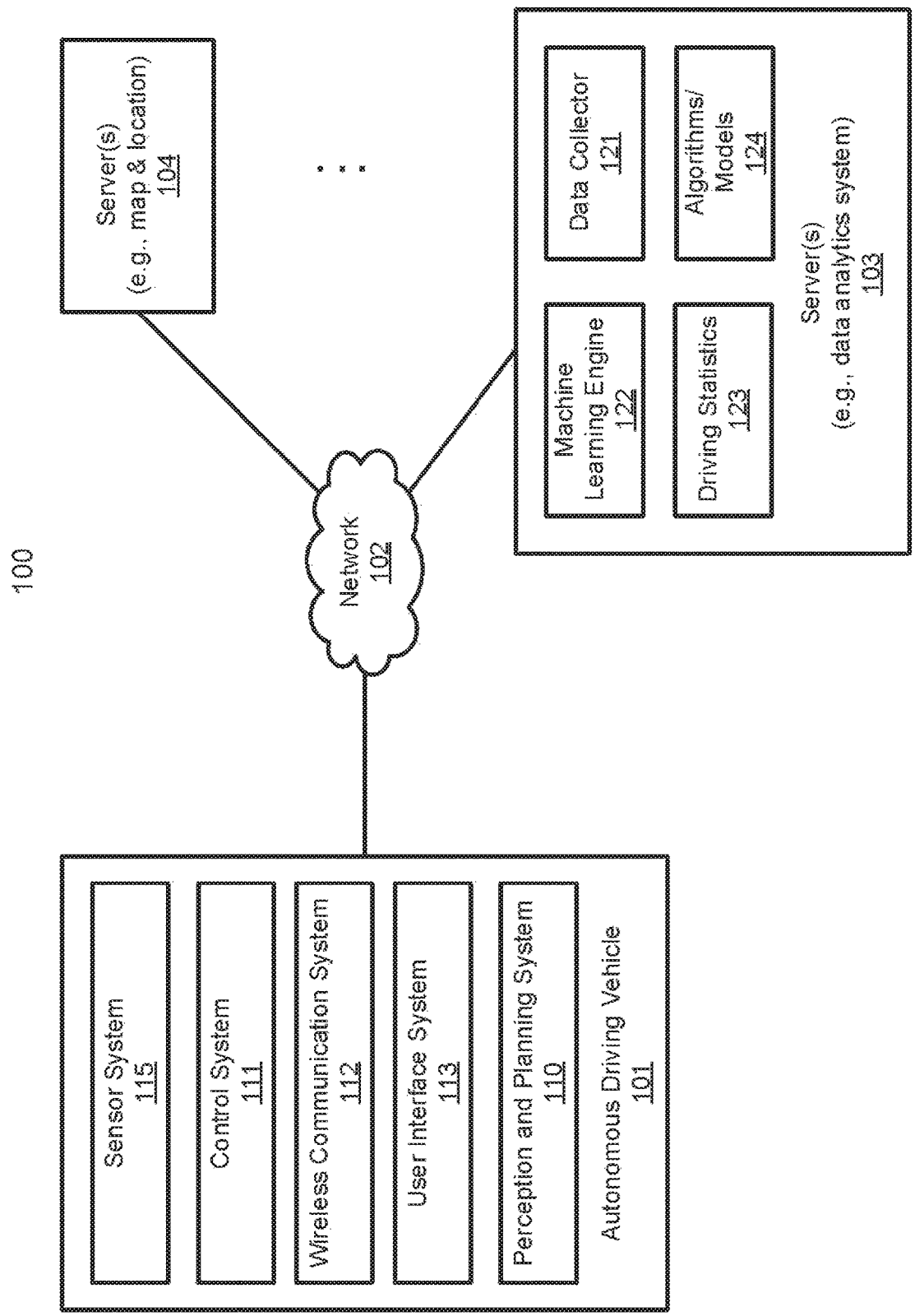
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The embodiments of the present disclosure provide for latency compensation in an inertial navigation system. Previously estimated locations can be stored for reference in a data structure (e.g., in a queue). The stored estimates may later be referenced to determine a bias of the GNSS data and adjust for the bias. For example, a processing device at an inertial navigation system (INS) may parse the GNSS data to identify a timestamp associated with the initial measurement of the GNSS data. The processing device may then identify a previously estimated location stored in the data structure that has a timestamp closest to the GNSS data timestamp (i.e., the location estimated at a time closest to when the GNSS data was received). The processing device may also identify a previously estimated location stored in the data structure with the most recent timestamp (i.e., the last estimated location of the vehicle) The processing device may then calculate a difference between the estimated location at the time the GNSS data was received and the most recent estimated location. The processing device may use the calculated difference to compensate the GNSS data for the bias (e.g., by adding the difference to the GNSS data). The processing device can then use the GNSS data, as adjusted, to estimate the current and future locations of the vehicle in conjunction with the IMU data.

According to some embodiments, a method for calculating location of an autonomous driving vehicle includes receiving global navigation satellite system data and identifying a previously estimated location with a timestamp closest to a timestamp of the GNSS data and a most recently estimated location. A processing device may calculate a difference between the two identified previously calculated locations and then adjust the received GNSS data according to the calculated difference. The adjusted GNSS data may then be used to calculate a current location of the ADV.

According to some embodiments, a system includes a memory and a processing device coupled to the memory. The processing device may receive global navigation satellite system data and identify a previously estimated location with a timestamp closest to a timestamp of the GNSS data and a most recently estimated location. The processing device may calculate a difference between the two identified previously estimated locations and then adjust the received GNSS data according to the calculated difference. The processing device may then use the adjusted GNSS data to calculate a current location of the ADV.

According to some embodiments, a non-transitory computer-readable storage medium includes instructions executable by a processing device. When executed, the instructions may cause the processing device to receive global navigation satellite system data and identify one previously estimated location with a timestamp closest to a timestamp of the GNSS data and a most recently estimated location. The processing device may calculate a difference between the two identified previously estimated locations and then adjust the received GNSS data according to the calculated difference. The adjusted GNSS data may then be used to calculate a current location of the ADV.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
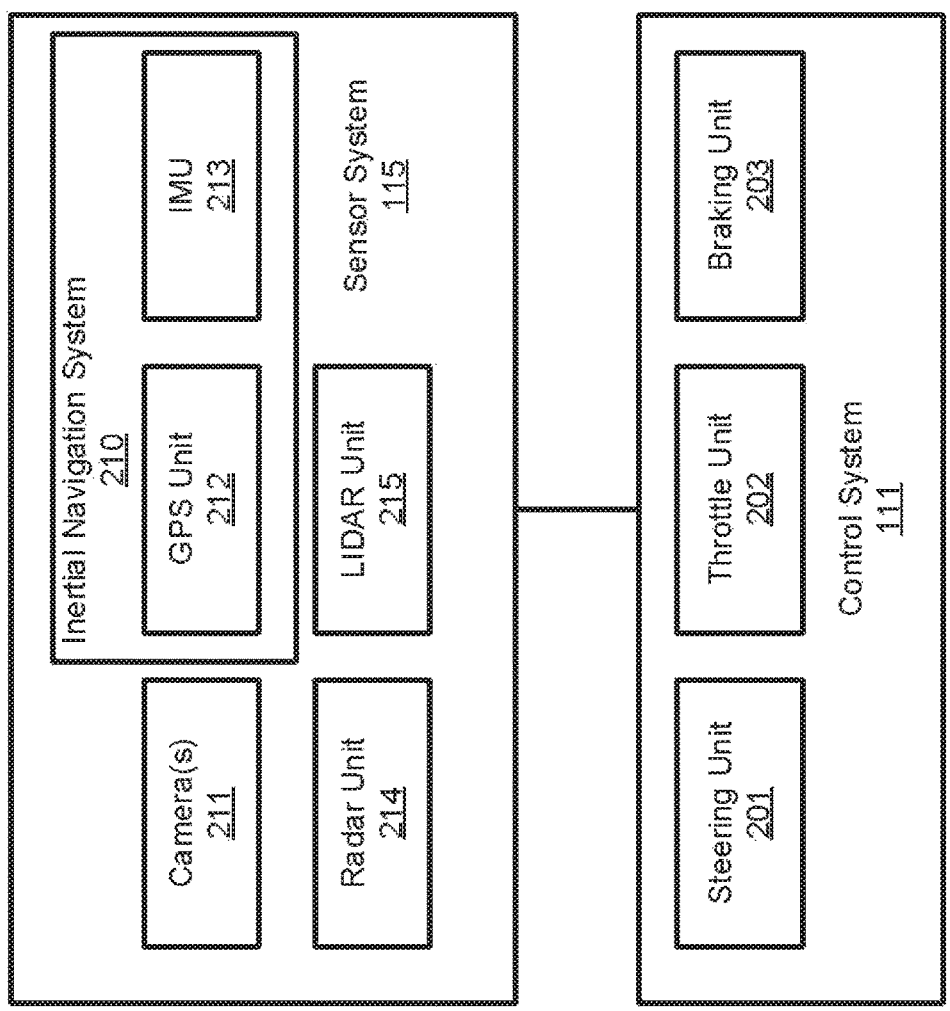
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS unit 212 and IMU 213 may be included together in an inertial navigation system (INS) 210. The INS 210 may combine data from the GPS unit 212 and the IMU 213 to calculate a precise location of the autonomous vehicle. GPS unit 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 may include an algorithm to synchronize the timing of IMU and GPS data. Algorithms 124 can then be uploaded on ADVs to be utilized during autonomous driving in real-time.

Figure 3:
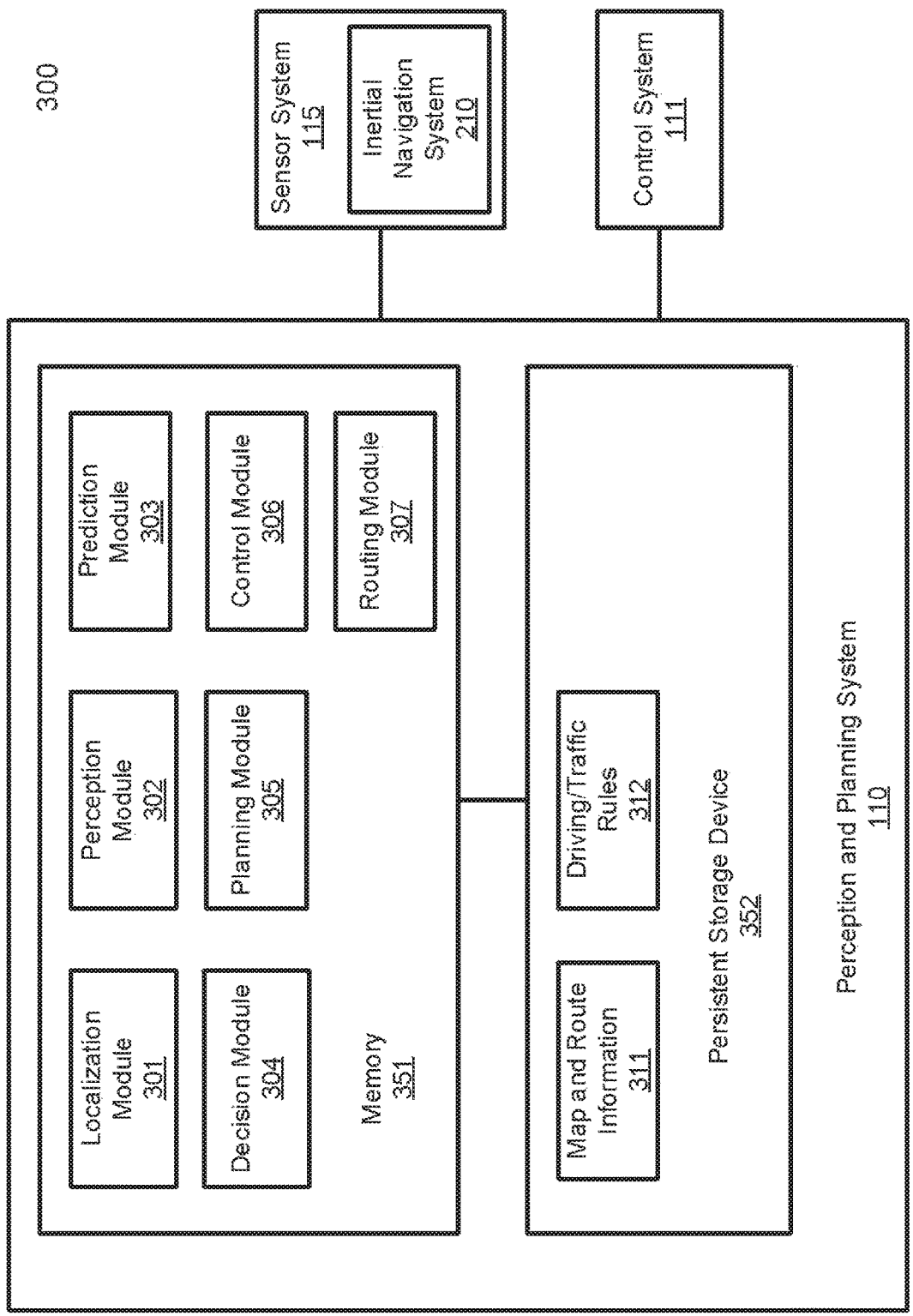
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging INS 210) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensor data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system, an inertial navigation system, and one or more maps so as to determine the driving path for the autonomous vehicle.

Figure 4:
FIG. 4 is a block diagram illustrating an example system architecture for autonomous driving according to one embodiment.

FIG. 4 is a block diagram illustrating system architecture for autonomous driving according to one embodiment. System architecture 400 may represent system architecture of an autonomous driving system as shown in FIG. 3. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. System architecture 400 further includes driver layer 404, firmware layer 405, and hardware layer 406. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5A:
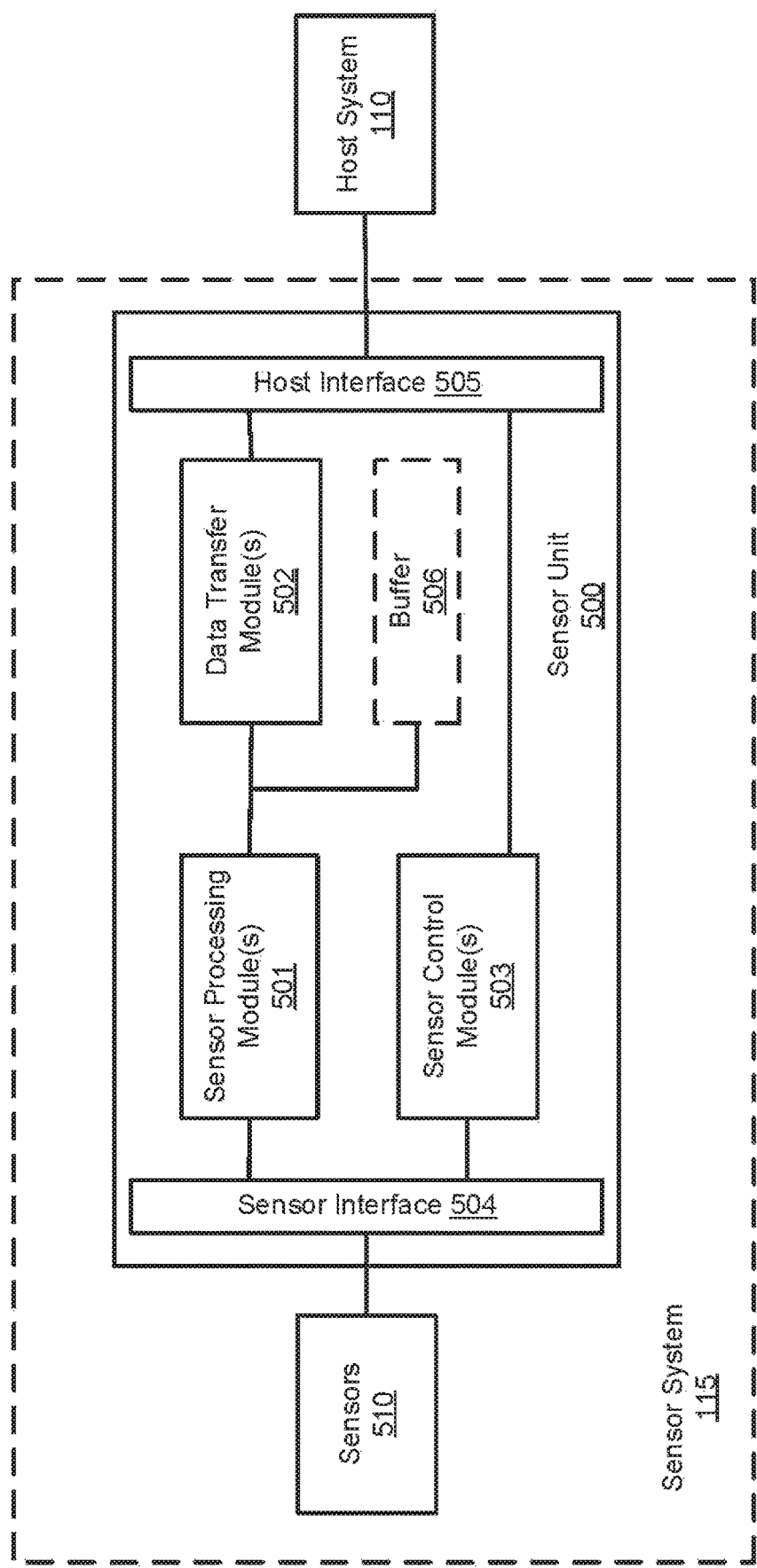
FIG. 5A is a block diagram illustrating an example of a sensor system of an autonomous vehicle according to one embodiment.

FIG. 5A is a block diagram illustrating an example of a sensor system according to one embodiment of the invention. Referring to FIG. 5, sensor system 115 includes a number of sensors 510 and a sensor unit 500 coupled to host system 110. Host system 110 represents a planning and control system as described above, which may include at least some of the modules as shown in FIG. 3. Sensor unit 500 may be implemented in a form of an FPGA device or an ASIC (application specific integrated circuit) device. In one embodiment, sensor unit 500 includes, amongst others, one or more sensor data processing modules 501 (also simply referred to as sensor processing modules), data transfer modules 502, and sensor control modules or logic 503. Modules 501-503 can communicate with sensors 510 via a sensor interface 504 and communicate with host system 110 via host interface 505. Optionally, an internal or external buffer 506 may be utilized for buffering the data for processing.

Figure 5B:
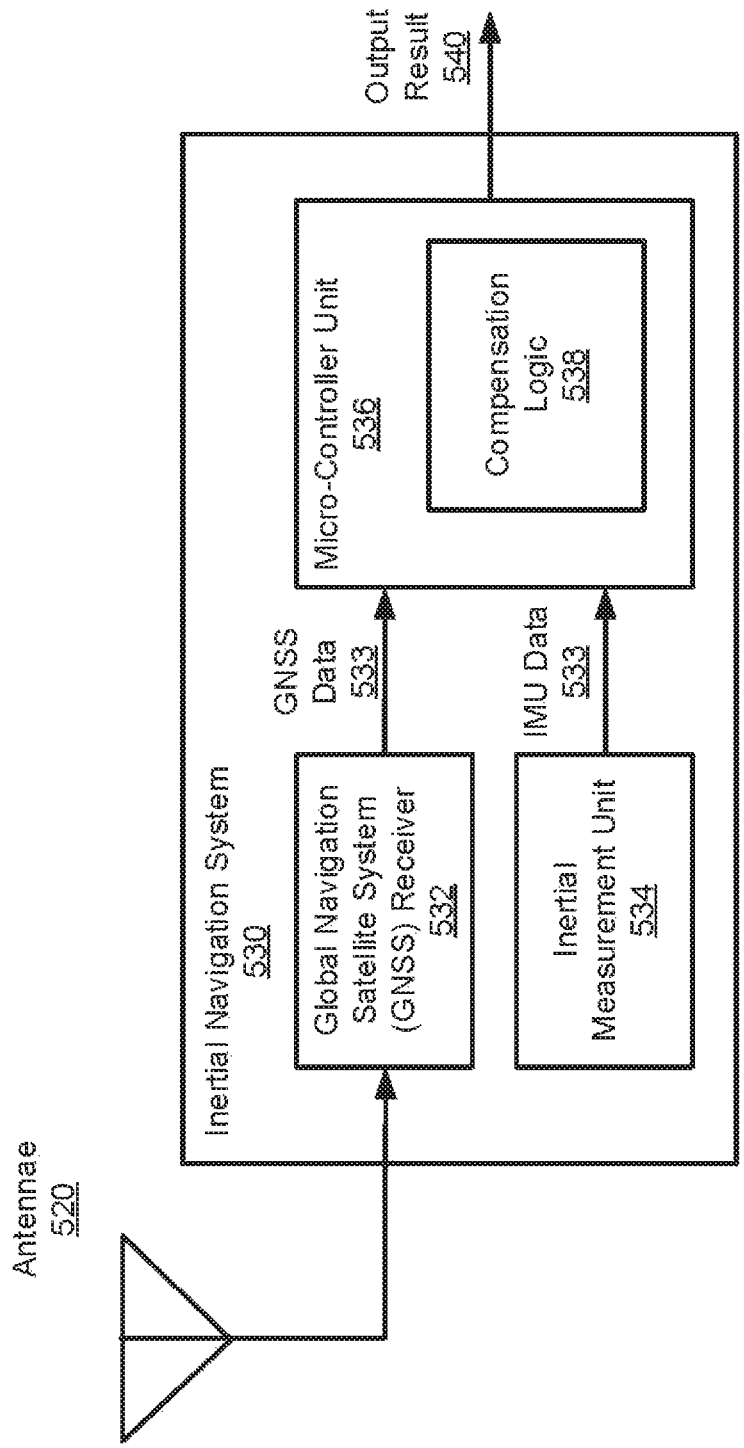
FIG. 5B is a block diagram illustrating an example inertial navigation system of an autonomous vehicle according to one embodiment.

In one embodiment, sensors 510 may be a GPS unit and an IMU. The GPS unit and IMU may be coupled together with a sensor unit 500 on a single FPGA, or ASIC, referred to as an inertial measurement unit (INS), as depicted in FIG. 5B. The sensor processing module 501 may include logic to receive data from the GPS unit and the IMU and combine the data (e.g., using a Kalman filter) to estimate a location of the automated vehicle. The sensor processing module 501 may further include, as described below with respect to FIG. 5, logic to compensate for GPS data bias due to propagation latencies of the GPS data.

In one embodiment, for the receiving path or upstream direction, sensor processing module 501 is configured to receive sensor data from a sensor via sensor interface 504 and process the sensor data (e.g., format conversion, error checking), which may be temporarily stored in buffer 506. Data transfer module 502 is configured to transfer the processed data to host system 110 using a communication protocol compatible with host interface 505. Similarly, for the transmitting path or downstream direction, data transfer module 502 is configured to receive data or commands from host system 110. The data is then processed by sensor processing module 501 to a format that is compatible with the corresponding sensor. The processed data is then transmitted to the sensor.

In one embodiment, sensor control module or logic 503 is configured to control certain operations of sensors 510, such as, for example, timing of activation of capturing sensor data, in response to commands received from host system (e.g., perception module 302) via host interface 505. Host system 110 can configure sensors 510 to capture sensor data in a collaborative and/or synchronized manner, such that the sensor data can be utilized to perceive a driving environment surrounding the vehicle at any point in time.

Sensor interface 504 can include one or more of Ethernet, USB (universal serial bus), LTE (long term evolution) or cellular, WiFi, GPS, camera, CAN, serial (e.g., universal asynchronous receiver transmitter or UART), SIM (subscriber identification module) card, and other general purpose input/output (GPIO) interfaces. Host interface 505 may be any high speed or high bandwidth interface such as PCIe (peripheral component interconnect or PCI express) interface. Sensors 510 can include a variety of sensors that are utilized in an autonomous driving vehicle, such as, for example, a camera, a LIDAR device, a RADAR device, a GPS receiver, an IMU, an ultrasonic sensor, a GNSS (global navigation satellite system) receiver, an LTE or cellular SIM card, vehicle sensors (e.g., throttle, brake, steering sensors), and system sensors (e.g., temperature, humidity, pressure sensors), etc.

For example, a camera can be coupled via an Ethernet or a GPIO interface. A GPS sensor can be coupled via a USB or a specific GPS interface. Vehicle sensors can be coupled via a CAN interface. A RADAR sensor or an ultrasonic sensor can be coupled via a GPIO interface. A LIDAR device can be coupled via an Ethernet interface. An external SIM module can be coupled via an LTE interface. Similarly, an internal SIM module can be inserted onto a SIM socket of sensor unit 500. The serial interface such as UART can be coupled with a console system for debug purposes.

Note that sensors 510 can be any kind of sensors and provided by various vendors or suppliers. Sensor processing module 501 is configured to handle different types of sensors and their respective data formats and communication protocols. According to one embodiment, each of sensors 510 is associated with a specific channel for processing sensor data and transferring the processed sensor data between host system 110 and the corresponding sensor. Each channel may include a specific sensor processing module and a specific data transfer module that have been configured or programmed to handle the corresponding sensor data and protocol.

When operating in a low latency mode, according to one embodiment, a data transfer module (e.g., data transfer module 502) is configured to send the sensor data received from a sensor to the host system as soon as possible without or with minimum delay. Some of sensor data are very sensitive in terms of timing that need to be processed as soon as possible. Examples of such sensor data include vehicle status such as vehicle speed, acceleration, steering angle, etc.

When operating in a high bandwidth mode, according to one embodiment, a data transfer module (e.g., data transfer module 502) is configured to accumulate the sensor data received from a sensor up to a predetermined amount, but is still within the bandwidth the connection between the data transfer module and the host system 110. The accumulated sensor data is then transferred to the host system 110 in a batch that maximum the bandwidth of the connection between the data transfer module and host system 110. Typically, the high bandwidth mode is utilized for a sensor that produces a large amount of sensor data. Examples of such sensor data include camera pixel data.

When operating in a memory mode, according to one embodiment, a data transfer module is configured to write the sensor data received from a sensor directly to a memory location of a mapped memory of host system 110, similar to a shared memory page. Examples of the sensor data to be transferred using memory mode include system status data such as temperature, fans speed, etc.

FIG. 5B depicts an inertial navigation system (INS) 530 which may be included within the sensor system 115 of FIG. 5A. The INS 530 includes, but is not limited to, a GNSS receiver 532 (otherwise referred to as GPS unit), an inertial measurement unit (IMU) 534, and micro-controller unit (MCU) 536. GNSS receiver 532 may receive and process GNSS measurements from antennae 520, which may be external to the INS 530 (e.g., on the roof of the vehicle). GNSS receiver 532 may then forward GNSS data 533 to the MCU 536. GNSS data 533 may include a position, velocity, and heading of the vehicle, along with timestamp indicating when the measurement was taken. In one embodiment, IMU 534 may measure acceleration and orientation of the automated vehicle and send these measurements to the MCU 536 to be combined with the GNSS data 533 (e.g., via a Kalman filter).

The MCU 536 may receive the GNSS data 533 and IMU data 535 and combine them (e.g., via a Kalman filter) to calculate an estimated location of the automated vehicle (e.g., output result 540). The MCU may receive GNSS data 533 at a much lower frequency than the IMU data 535. The MCU 536 may calculate an estimated location of the vehicle each time IMU data 535 is received. Because the IMU data 535 is received by the MCU at a higher frequency, the MCU calculations may use the most recent GNSS data for each of the new location estimations using each newly received IMU data 535 until new GNSS data is received. Once the MCU 536 receives the new GNSS data, the Kalman filter calculation is updated with the new GNSS data. However, since the GNSS data 533 is received from antenna 520 and must propagate to the GNSS receiver 532 to be processed and forwarded to the MCU 536, the GNSS data may have a bias due to latency (e.g., 50-60 ms). For example, a fast traveling vehicle may have traveled a substantial distance from the time of the GNSS measurement to the time that the MCU 536 uses the GNSS data 533 in the location estimate. Thus, the location estimate may be inaccurate due to the bias of the GNSS data 533 from the propagation delay.

However, the MCU 536 may include compensation logic 538, such as software or firmware, to adjust for the GNSS data latency. In one embodiment, MCU 536 temporarily stores each output result 540 (i.e., each estimated location) in a data structure, such as a queue. When the MCU 536 receives new GNSS data 533, the compensation logic 538 of the MCU 536 can update the GNSS data 533 based on the difference of the most recently stored estimated location and the estimated location at the time the GNSS data 533 was first measured and timestamped. The compensation logic 538 may then add the difference to the originally received GNSS data 533 to obtain adjusted GNSS data that can then be used to update the location estimation. In one embodiment, the MCU 536 may search the data structure for the estimated location stored in the data structure that has a timestamp that is the closest to the timestamp of the GNSS data 533. The MCU 536 may then retrieve the most recent estimated location stored in the data structure. The compensation logic 538 may calculate a difference between the two estimated locations and add the different to the GNSS data 533. The MCU 536 may use the adjusted GNSS data to update the Kalman filter estimation for more accurate location estimates.

Figure 6:
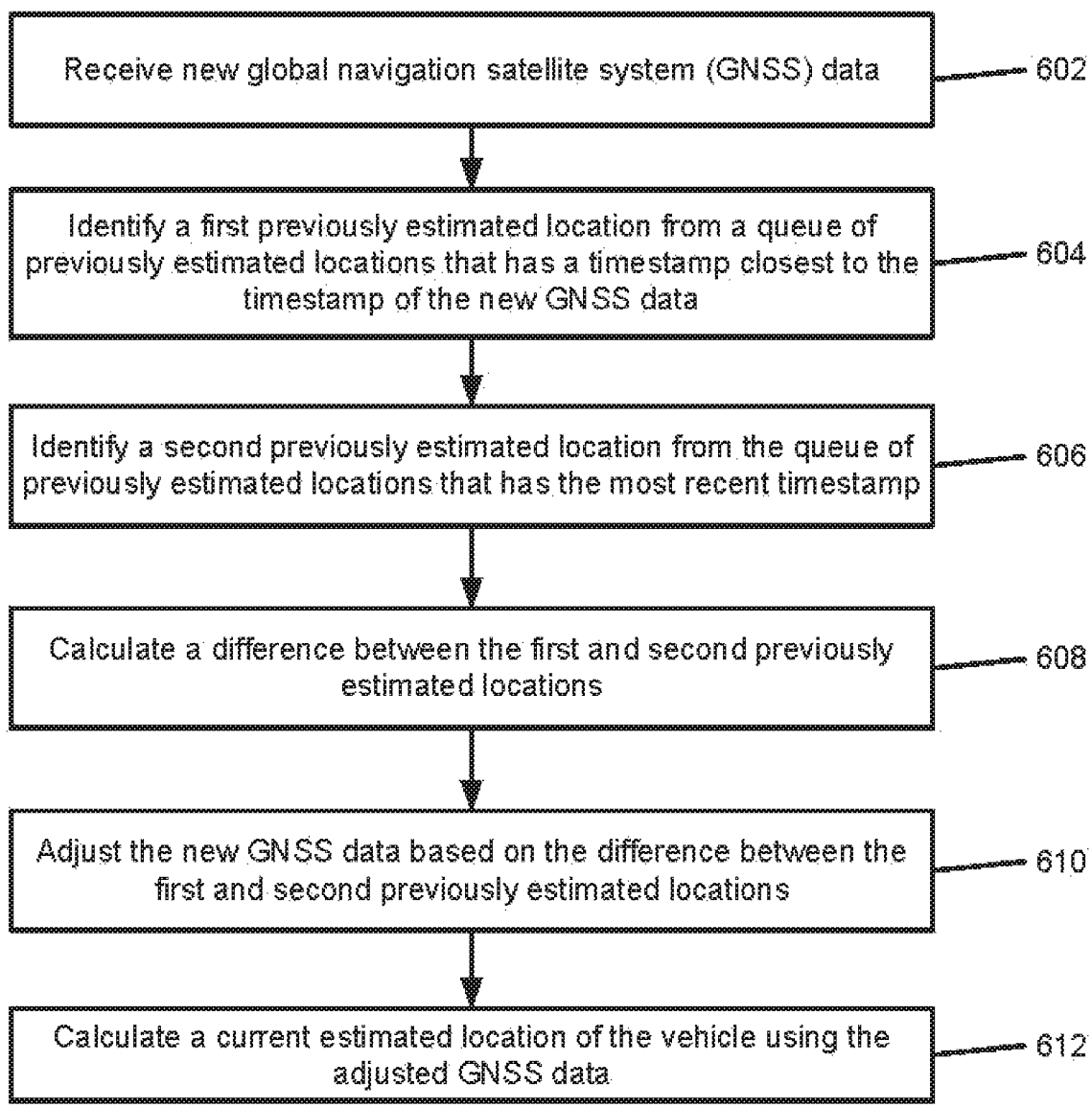
FIG. 6 is a flow diagram illustrating an example method for compensating for latencies within an inertial navigation system according to one embodiment.

FIG. 6 is a flow diagram illustrating a process of adjusting for GNSS latency in an inertial navigation system of an autonomous vehicle according to one embodiment. Process 600 may be performed by compensation logic at an MCU of an INS. At operation 602, the processing logic receives new global navigation satellite system (GNSS) data. An antenna may be connected to a GNSS receiver. The antenna may detect a GNSS measurement, at which point it is time-stamped and transmitted to the GNSS receiver. The GNSS receiver may process and format the received GNSS data to be forwarded to the MCU. The GNSS measurement may include a position, velocity, and heading of the vehicle. The MCU may parse the GNSS data to identify a timestamp of the GNSS measurement.

At operation 604, the processing logic identifies a first previously estimated location from a data structure storing previously estimated locations, the first previously estimated location having a timestamp that is closest to the timestamp of the GNSS data. In one embodiment, the data structure may be a first-in first-out buffer, such as a queue. In one embodiment, the processing logic may identify the estimated location having the closest timestamp by iteratively retrieving the oldest data in the queue and calculating a difference between the timestamp of the oldest data and the GNSS data timestamp until a local minimum is found. In another embodiment, the timestamp of each estimated location may be compared to the GNSS data timestamp and an estimated location with the smallest timestamp difference identified. The closest estimated location may also be identified in any other manner.

At operation 606, the processing logic identifies a second previously estimated location from the data structure of previously estimated locations, the second previously estimated location having the most recent timestamp of the previously estimated locations in the data structure. Because the data structure in which the estimated locations are stored may be a FIFO buffer (i.e., a queue), the estimated location may be stored at the "rear" of the queue (most recently pushed, or added to the queue). Therefore, the processing logic may simply retrieve the entry from the rear of the queue. If the estimated locations are not stored in a FIFO buffer, the processing logic may compare the timestamps to a current time (e.g., a real time clock) to identify the most recently calculated location.

At operation 608, the processing logic calculates a difference between the first and second previously estimated locations. The difference may represent a distance that the automated vehicle has traveled between receiving the GNSS data and processing the GNSS data by the MCU. Thus, the difference may be a change in the estimated location of the vehicle during the GNSS data delay. The difference may additionally include changes in velocity and heading of the vehicle during the delay as well.

At operation 610, the processing logic adjusts the new GNSS data based on the difference between the first and second previously estimated locations. The processing logic may adjust the new GNSS data by adding the difference between the first and second previously estimated locations to the new GNSS data to obtain adjusted GNSS data. For example, the processing logic may calculate a difference between the estimated location at the time the GNSS data was received and the most recent estimated location, and use the calculated difference to compensate the GNSS data for the bias (e.g., by adding the difference to the GNSS data) (see FIGS. 5B, 8A, 8B, and corresponding text for further details). The adjusted GNSS data may more accurately represent a current position of the automated vehicle at the time the data is processed by the MCU than the original GNSS data.

At operation 612, the processing logic calculates a current estimated location of the vehicle using the adjusted GNSS data. The adjusted GNSS data may more accurately represent a current position of the vehicle. Therefore, calculating the estimated location of the vehicle using the adjusted GNSS data may result in a more accurate estimation of the vehicles current location. Additionally, any further location estimates calculated using the adjusted GNSS data may also be more accurate. For example, each time new IMU data is received and a new location is estimated, the adjusted GNSS data may be used for the estimation until new GNSS data is received. The process may then be repeated for the newest GNSS data.

Figure 7:
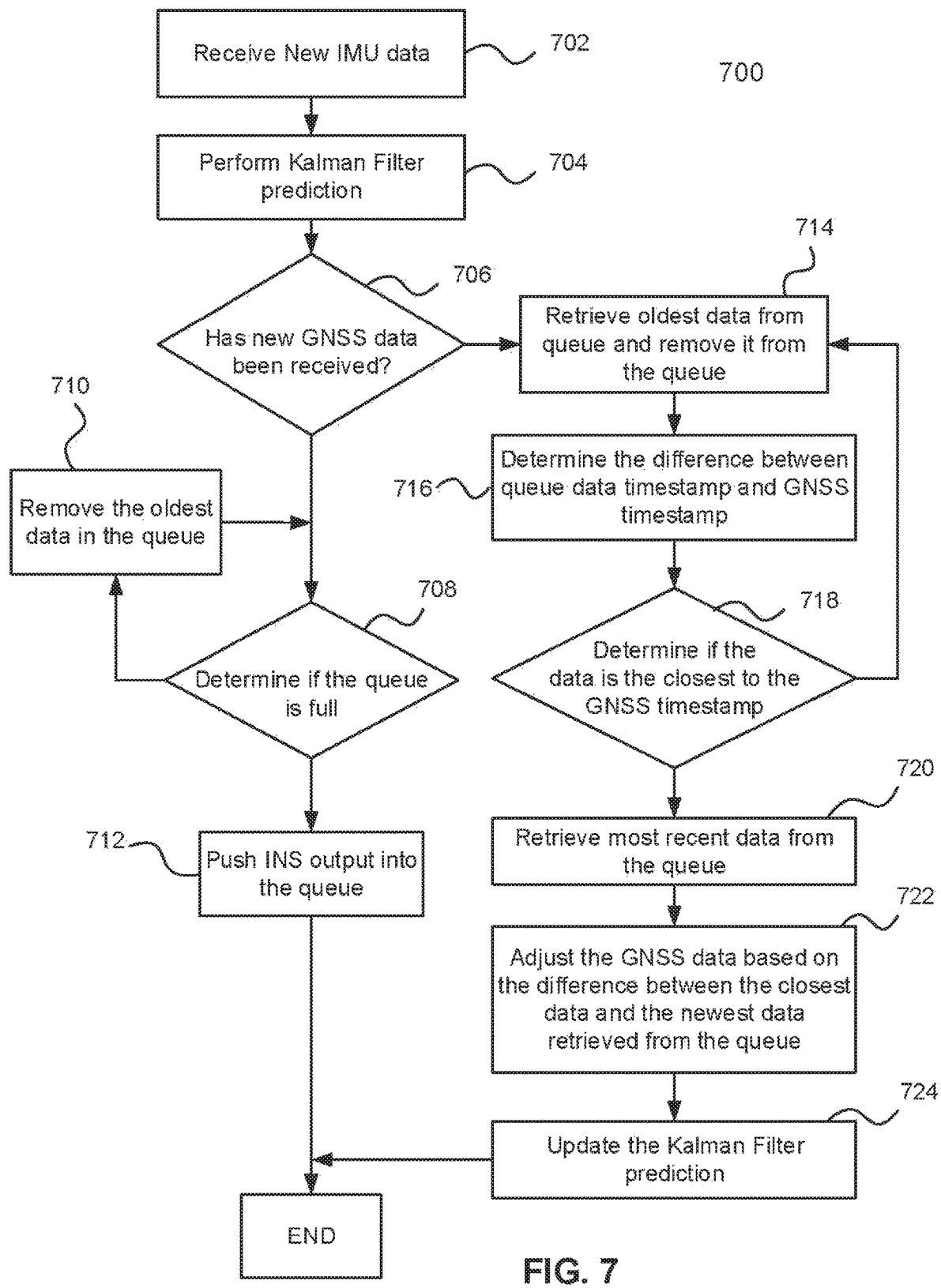
FIG. 7 is a flow diagram illustrating another example method for compensating for latencies within an inertial navigation system according to one embodiment.

FIG. 7 is a flow diagram illustrating a process of adjusting for GNSS latency in an INS according to another embodiment. Process 700 may be performed by compensation logic at an MCU of an INS. At operation 702, the processing logic receives new IMU data. At operation 704, the processing logic performs a Kalman filter prediction using the new IMU data. The Kalman filter may be an algorithm or logic that weights the inputs that it receives based on the uncertainty and/or error associated with the inputs. For example, in some circumstances the Kalman filter may weight the GNSS data much higher than the IMU data because the GNSS data has a lower uncertainty associated with the measurement than the IMU has. In some embodiments, such as if the vehicle is in a tunnel, the IMU may have a lower uncertainty than the GNSS data in which case the Kalman filter may weight the IMU data higher. The result of the Kalman filter prediction may be an estimated position of the vehicle based on GNSS data and IMU data. The processing logic may perform the prediction, or calculation, each time new IMU data is received, whether or not new GNSS data is received because IMU data is received at a much higher frequency than the GNSS data.

At operation 706, the processing logic determines if new GNSS data has been received. The processing logic of the MCU may set a flag in a register of the MCU when new GNSS data is received The new GNSS data may be temporarily stored in a buffer when it is received at the MCU. The flag may indicate that new GNSS data has been received and that the new GNSS data is being stored in the buffer to be retrieved by the processing logic. Therefore, when the flag is set, the processing logic may retrieve the GNSS data from the buffer, in addition to continuing to operation 714, described below.

At operation 708, in response to determining that new GNSS data has not been received, the processing logic determines if a queue storing previously estimated locations is full. If no new GNSS data has been received then no compensation for GNSS data bias may be required. The queue may be configured to store a fixed number of the most recent location estimations. The queue size may be directly, or indirectly, depend on the latency of the GNSS data. The queue may need to be large enough to store estimated locations at least for the length of time of the GNSS data delay. For example, if the maximum delay of the GNSS data is 100 ms, then the queue size may maintain 150 ms worth of previous location predictions/estimations. In one embodiment, the queue may be a first in first out data buffer (e.g., least recently added data is removed from the queue first). Each entry in the queue may include a calculated position, velocity, heading, timestamp, and any other information associated with a location of the automated vehicle.

At operation 710, in response to determining that the queue is full, the processing logic removes the oldest data (i.e., the least recently estimated location) in the queue. The processing logic may remove the oldest data to make room for the newest location estimation to be stored in the queue. At operation 712, in response to determining that the queue is not full, the processing logic pushes most recent INS output (newest estimated location) into the queue.

At operation 714, in response to determining that new GNSS data has been received, the processing logic retrieves the oldest data from the queue. In one embodiment, the processing logic then removes the oldest (least recent) data from the queue. Because the queue is used to find an estimated location with a timestamp closest to the GNSS data timestamp, any oldest estimation/data that does not correspond to the closest data may be removed from the queue after the comparison of operation 716 and 718.

At operation 716, the processing logic determines the difference between the retrieved queue data timestamp and the GNSS timestamp. At operation 718, the processing logic determines, based on the difference from operation 716, whether the retrieved queue data is the closest to the GNSS timestamp. In one embodiment, the processing logic identifies the closest queue data by determining that it is a local minimum. For example, the difference calculated at operation 714 may be compared to a previously calculated difference. If the previously calculated difference is larger than the current difference, the comparisons will continue by returning to operation 714. Otherwise, if the previously calculated difference is less than the current difference, then the previous data may be identified as the local minimum and the data closest to the GNSS timestamp. In other words, as the comparisons continue, the difference will decrease until the local minimum and then increase immediately following the local minimum.

At operation 720, in response to determining that the retrieved queue data is the closest to the GNSS timestamp, the processing logic retrieves the most recent data from the queue (i.e., estimated location last pushed to the queue). At operation 722, the processing logic adjusts the GNSS data based on the difference between the data closest to the GNSS timestamp and the most recent data pushed to the queue. The difference between the closest data to the GNSS timestamp and the most recent estimation may represent a distance the vehicle has traveled between the time the GNSS measurement data was first received by the antenna and timestamped and the time the GNSS data is received at the MCU for location calculation. Therefore, adjusting the newly received GNSS data using the above difference may provide for a more accurate representation of a position of the vehicle at the time the GNSS data is used to calculate/estimate the current location of the automated vehicle.

At operation 724, the processing logic updates the Kalman filter prediction from operation 704. The update uses the adjusted GNSS data as an input to the Kalman filter which may more accurately represent the current location of the automated vehicle than the originally received GNSS measurement that may be bias due to delay in processing the GNSS data.

Figure 8A:
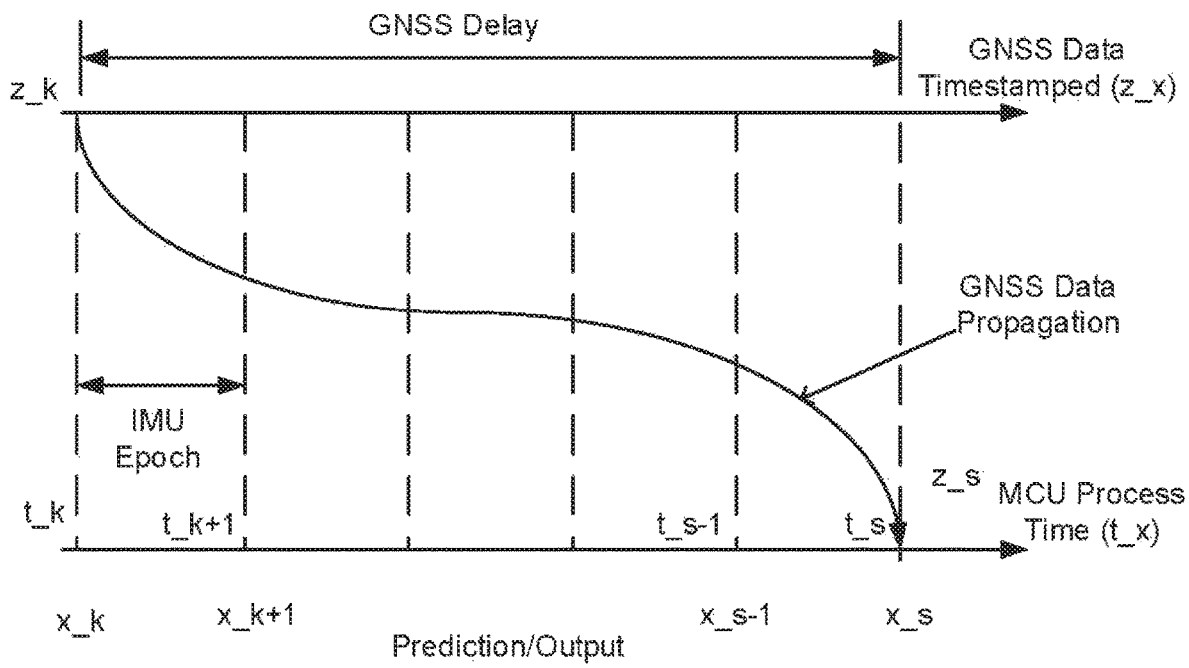
FIGS. 8A-B depict processing of data received from a global positioning satellite system and an inertial measurement unit and a queue storing estimated locations of an autonomous vehicle according to one embodiment.
Figure 8B:
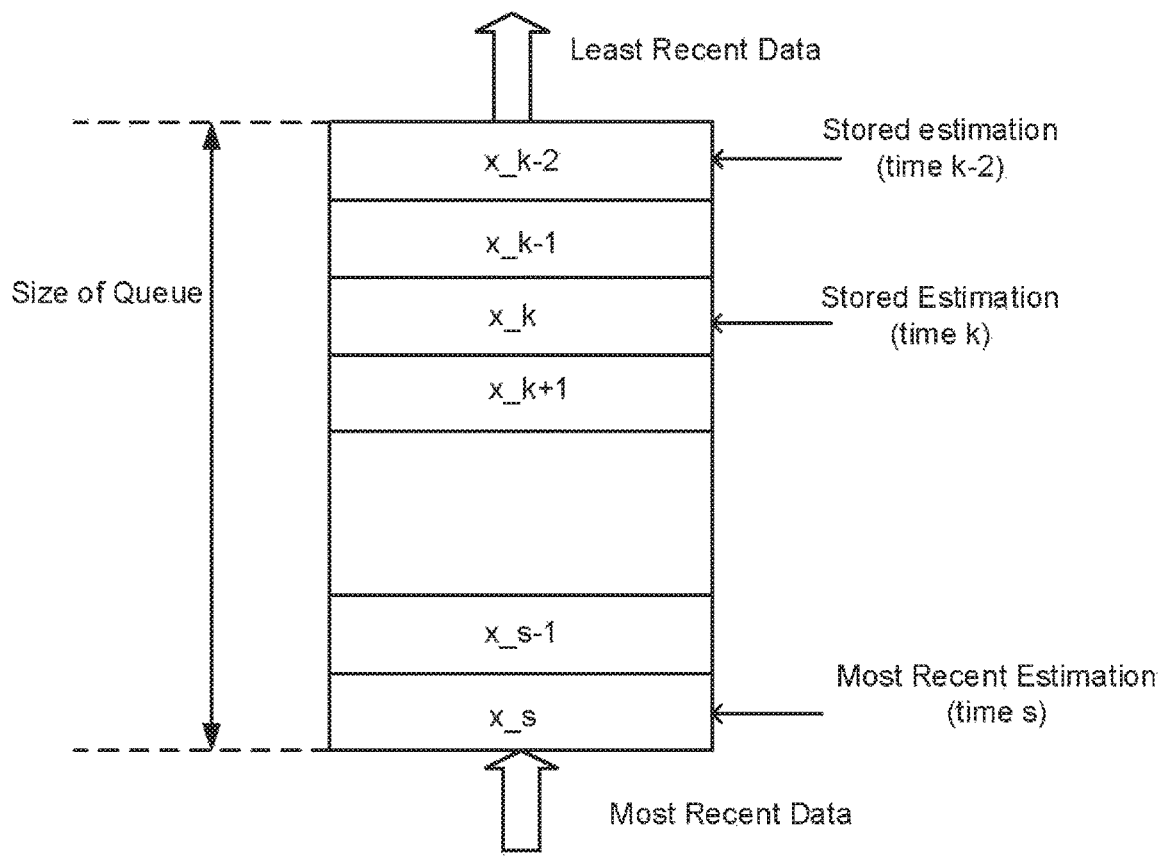

FIG. 8A is a diagram illustrating processing time and GNSS latency in an INS according to one embodiment. FIG. 8B is a diagram illustrating a queue of previously calculated locations (e.g., from FIG. 8A) according to one embodiment. In FIG. 8A, GNSS data "z_k" (i.e., a GNSS measurement) is received at a vehicle antenna. The GNSS data may be timestamped at the time at which it is received (e.g., t_k). The GNSS data "z_k" may be propagated to an MCU for location estimation calculations to be performed. There may be a GNSS delay corresponding to the time it takes for GNSS data to reach the MCU. During the GNSS data propagation, IMU data may continue to be received by the MCU (e.g., every IMU epoch, as depicted). Each time the MCU receives new IMU data, the MCU may calculate a new estimated location (e.g., "x_k," "x_k+1," etc.). In one embodiment, one of the estimated locations may correspond to the time at which the GNSS data was first received and timestamped (i.e., estimation x_k at time t_k). Additionally, there may be estimated locations calculated for each IMU data up until the new GNSS data is received at the MCU. Accordingly, there may be a most recent location estimate (x_s) calculated immediately before the new GNSS data is received at the MCU, to update Kalman filter predictions for current and future location estimates.

In FIG. 8B, each of the estimated locations calculated according to FIG. 8A may be stored in a data structure, such as a queue. For example, the estimated locations from time (t_k−2) to (t s) may be stored in the queue. The MCU may use the queue to correct for bias in the received z_k GNSS data due to the GNSS delay of the GNSS data propagation. In one embodiment, upon receiving the new GNSS data (z_k), the MCU may identify a stored estimation that corresponds most closely to the time at which the GNSS data was timestamped. In the current example, the GNSS data was received at time k and thus the timestamp of the stored estimation "x_k" most closely matches the timestamp of the GNSS data. Although FIG. 8 depicts the estimated location x_k as being calculated at the same time as the GNSS data timestamp t_k, the estimated calculation may have a slightly different actual timestamp than the GNSS data. Once the closest stored estimation is identified (i.e., x_k), the most recent estimation "x_s" is identified. The most recent estimate may be the most recent estimate pushed to the queue. The MCU may then compare the stored estimations of the closest estimation and the most recent estimation to determine an approximate bias of the received GNSS data (z_k). The determined bias may then be added to the GNSS data to adjust for the bias prior to calculating the next estimated location. In one embodiment, the adjusted GNSS data may be used to update a Kalman filter prediction of the location of the automated vehicle. Thus, adjusting the GNSS data to account to the bias may provide for more accurate location estimation/prediction.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

The invention claimed is:

1. A method for calculating location of an autonomous driving vehicle (ADV), comprising:
   receiving, at a processing device, new global navigation satellite system (GNSS) data that was captured at a first point in time;
   identifying a first previously estimated location, from a plurality of previously estimated locations, having a first timestamp that is closest to the first point in time;
   identifying a second previously estimated location, from the plurality of previously estimated locations, having a second timestamp that is closest to a current time, wherein the first point in time occurred prior to the current time;
   adjusting the new GNSS data based on a difference between the first previously estimated location and the second previously estimated location; and
   calculating, based on the adjusted GNSS data, a current estimated location of the ADV.

2. The method of claim 1, wherein the plurality of previously estimated locations is stored in a first in first out (FIFO) queue, and wherein each of the plurality of previously estimated locations is pushed into the FIFO queue upon calculation.

3. The method of claim 1, wherein each of the plurality of previously estimated locations is calculated using at least GNSS data and inertial measurement unit (IMU) data, wherein the IMU data is received at a higher frequency than the GNSS data.

4. The method of claim 1, wherein identifying the first previously estimated location comprises:
   calculating a difference between a timestamp of the new GNSS data corresponding to the first point in time and a timestamp of at least one previously estimated location from the plurality of previously estimated locations; and
   identifying a smallest difference indicating the first previously estimated location with the first timestamp closest to the timestamp of the new GNSS data corresponding to the first point in time.

5. The method of claim 1, wherein adjusting the new GNSS data comprises adding the difference to the new GNSS data.

6. The method of claim 1, wherein location data of the current estimated location comprises at least one of a geographic position of the ADV, a velocity of the ADV, or a heading of the ADV.

7. The method of claim 1, wherein the plurality of previously estimated locations are calculated using GNSS data and IMU data as an input to a Kalman filter.

8. A data processing system for calculating a location of an autonomous driving vehicle (ADV) comprising:
   a processing device; and
   a memory coupled to the processing device to store instructions, which when executed by the processing device, cause the processing device to perform operations, the operations comprising:
      receiving new global navigation satellite system (GNSS) data that was captured at a first point in time;
      identifying a first previously estimated location, from a plurality of previously estimated locations, having a first timestamp that is closest to the first point in time;
      identifying a second previously estimated location, from the plurality of previously estimated locations, having a second timestamp that is closest to a current time, wherein the first point in time occurred prior to the current time;
      adjusting the new GNSS data based on a difference between the first previously estimated location and the second previously estimated location; and
      calculating, based on the adjusted GNSS data, a current estimated location of the ADV.

9. The system of claim 8, wherein the plurality of previously estimated locations is stored in a first in first out (FIFO) queue, and wherein each of the plurality of previously estimated locations is pushed into the FIFO queue upon calculation.

10. The system of claim 8, wherein each of the plurality of previously estimated locations is calculated using at least GNSS data and inertial measurement unit (IMU) data, wherein the IMU data is received at a higher frequency than the GNSS data.

11. The system of claim 8, wherein identifying the first previously estimated location comprises:

calculating a difference between a timestamp of the new GNSS data corresponding to the first point in time and a timestamp of at least one previously estimated location from the plurality of previously estimated locations; and identifying a smallest difference indicating the first previously estimated location with a the first timestamp closest to the timestamp of the new GNSS data corresponding to the first point in time.

12. The system of claim 8, wherein adjusting the new GNSS data comprises adding the difference to the new GNSS data.

13. The system of claim 8, wherein location data of the current estimated location comprises at least one of a geographic position of the ADV, a velocity of the ADV, or a heading of the ADV.

14. The system of claim 8, wherein the plurality of previously estimated locations are calculated using GNSS data and IMU data as an input to a Kalman filter.

15. A non-transitory machine-readable medium having instructions stored therein, which when executed by a processor, cause the processor to perform operations to calculate a location of an autonomous driving vehicle (ADV), the operations comprising:

receiving new global navigation satellite system (GNSS) data that was captured at a first point in time;

identifying a first previously estimated location, from a plurality of previously estimated locations, having a first timestamp that is closest to the first point in time;

identifying a second previously estimated location, from the plurality of previously estimated locations, having a second timestamp that is closest to a current time, wherein the first point in time occurred prior to the current time;

adjusting the new GNSS data based on a difference between the first previously estimated location and the second previously estimated location; and calculating, based on the adjusted GNSS data, a current estimated location of the ADV.

16. The machine-readable medium of claim 15, wherein the plurality of previously estimated locations is stored in a first in first out (FIFO) queue, and wherein each of the plurality of previously estimated locations is pushed into the FIFO queue upon calculation.

17. The machine-readable medium of claim 15, wherein each of the plurality of previously estimated locations is calculated using at least GNSS data and inertial measurement unit (IMU) data, wherein the IMU data is received at a higher frequency than the GNSS data.

18. The machine-readable medium of claim 15, wherein identifying the first previously estimated location comprises:

calculating a difference between a timestamp of the new GNSS data corresponding to the first point in time and a timestamp of at least one previously estimated location from the plurality of previously estimated locations; and identifying a smallest difference indicating the first previously estimated location with the first timestamp closest to the timestamp of the new GNSS data corresponding to the first point in time.

19. The machine-readable medium of claim 15, wherein adjusting the new GNSS data comprises adding the difference to the new GNSS data.

20. The machine-readable medium of claim 15, wherein location data of the current estimated location comprises at least one of a geographic position of the ADV, a velocity of the ADV, or a heading of the ADV.

* * * * *